United States Patent
Yang et al.

(10) Patent No.: US 11,807,133 B2
(45) Date of Patent: Nov. 7, 2023

(54) BUS BREAKER CONTROL CIRCUIT FOR RAILWAY VEHICLE

(71) Applicant: CRRC Nanjing Puzhen Co., Ltd., Nanjing (CN)

(72) Inventors: Li Yang, Nanjing (CN); Caixia Shi, Nanjing (CN); Wei Xie, Nanjing (CN); Lian Ge, Nanjing (CN); Hemin Ding, Nanjing (CN); Jianglong Chang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 248 days.

(21) Appl. No.: 17/436,659

(22) PCT Filed: Nov. 11, 2020

(86) PCT No.: PCT/CN2020/128071
§ 371 (c)(1),
(2) Date: Sep. 7, 2021

(87) PCT Pub. No.: WO2022/088260
PCT Pub. Date: May 5, 2022

(65) Prior Publication Data
US 2022/0324352 A1 Oct. 13, 2022

(30) Foreign Application Priority Data
Oct. 26, 2020 (CN) .......................... 202011156778.3

(51) Int. Cl.
*B60M 3/00* (2006.01)
*H02H 7/22* (2006.01)

(52) U.S. Cl.
CPC ................ *B60M 3/00* (2013.01); *H02H 7/22* (2013.01)

(58) Field of Classification Search
CPC .................................... H02H 7/22; B60M 3/00
See application file for complete search history.

(56) References Cited

FOREIGN PATENT DOCUMENTS

| CN | 202444244 U | 9/2012 |
| CN | 203607335 U | 5/2014 |
| CN | 106476626 A | 3/2017 |
| CN | 109515197 A | 3/2019 |
| CN | 209329687 U | 8/2019 |
| CN | 211456660 U | 9/2020 |
| KR | 20150001987 A | 1/2015 |

*Primary Examiner* — Adi Amrany
(74) *Attorney, Agent, or Firm* — Bayramoglu Law Offices LLC

(57) ABSTRACT

A bus breaker control circuit for a railway vehicle includes a close relay, an open relay, a power supply circuit for a bus breaker, a power supply circuit for the hold relay, and a delay module; the power supply circuit for the hold relay comprises a normally-closed contact of the open relay, an auxiliary normally-open contact of the bus breaker, and the hold relay sequentially connected in series to a train power supply; the power supply circuit for the bus breaker comprises a normally-open contact of the hold relay and the bus breaker sequentially connected in series to the train power supply; and the delay module is connected in parallel with the hold relay, normally-closed contacts of the delay module are connected in series to the power supply circuit for the close relay.

17 Claims, 1 Drawing Sheet

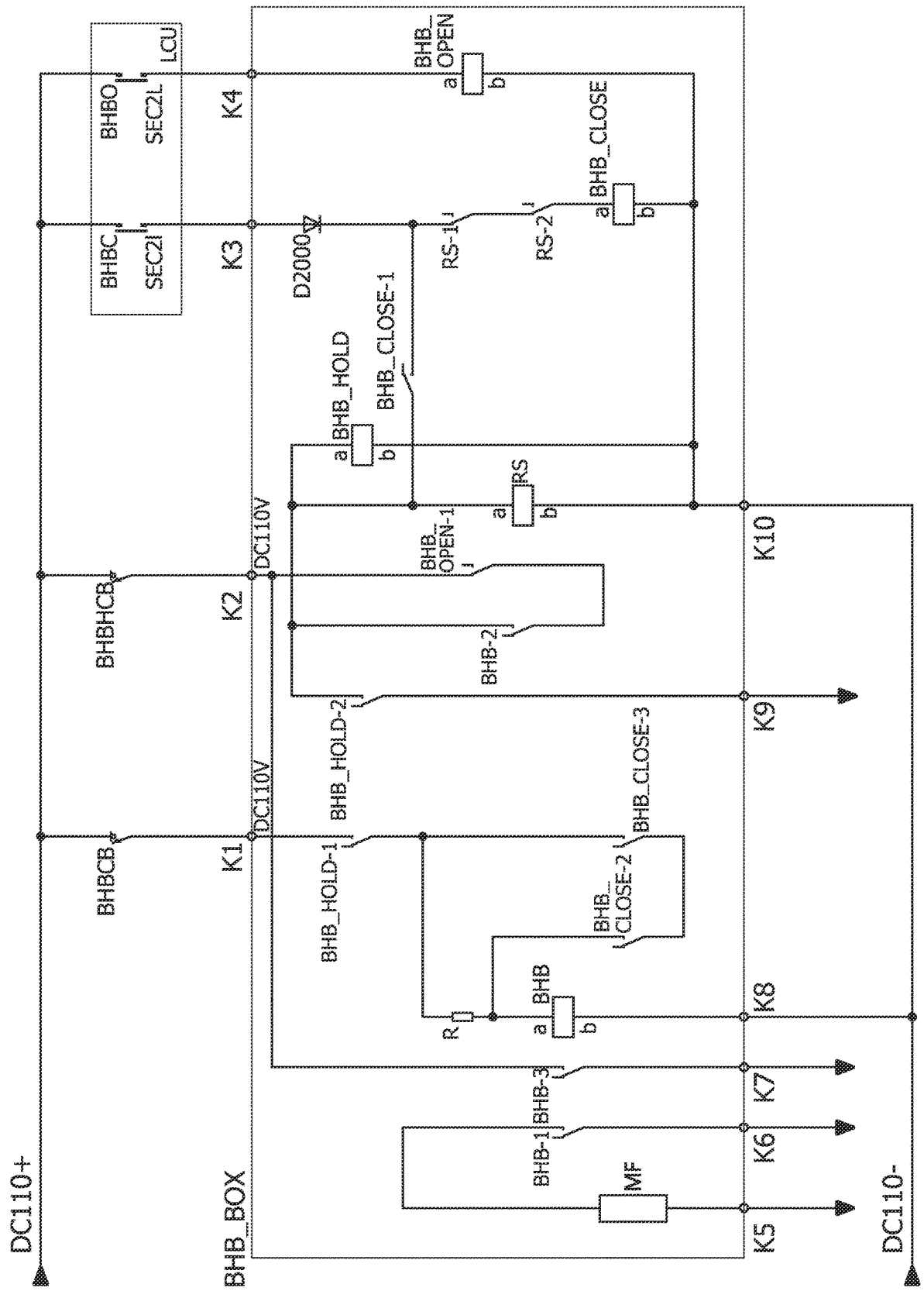

US 11,807,133 B2

BUS BREAKER CONTROL CIRCUIT FOR RAILWAY VEHICLE

CROSS REFERENCE TO THE RELATED APPLICATIONS

This application is the national stage entry of International Application No. PCT/CN2020/128071, filed on Nov. 11, 2020, which is based upon and claims priority to Chinese Patent Application No. 202011156778.3 filed on Oct. 26, 2020, the entire contents of which are incorporated herein by reference.

TECHNICAL FIELD

The present invention relates to bus breaker control for a subway vehicle, and belongs to field of design of subway vehicle control circuits and third rail current collection control systems.

BACKGROUND

When third rail current collection is used in the main circuit design of an existing urban railway vehicle, each car is provided with a current collector in order to ensure the reliability of current collection of the whole vehicle because non-power areas exist in design and constructure due to the factors such as gauges, turnouts or parking garages. According to the actual conditions of the non-power zones of the line in combination with the maintenance safety in the garages, a traction bus is arranged between adjacent cars, and the connection/disconnection of a bus contactor box (a bus breaker and a contactor) is controlled for pass-through control of the non-power zones. The but contactor box is directly driven by a traction control unit DUC, and When the vehicle runs at a speed lower than a preset low speed, the contactor is disconnected to prevent bridging between different power supply ranges when a vehicle stops at zero velocity, and when the speed is higher than a preset speed, the traction control unit DCU closes the bus contactor. When the DCU itself fails, a bus high-voltage circuit breaker closing instruction cannot be output, so that the circuit breaker cannot be closed; and when a vehicle stops at zero velocity in the non-power zones while the bus high-voltage circuit breaker cannot be closed under the condition that a normal current collection unit traction inverter fails or some current collectors cannot be lifted, a rescue required, and if the high-voltage circuit breaker is frequently closed with a load, the service life of the high-voltage circuit breaker is may be affected, so that the cost is increased.

SUMMARY

A main object of the present invention is to solve the problems in the prior art, and provides a bus breaker control circuit for a railway vehicle.

In order to solve the technical problem described above, the present invention provides a bus breaker control circuit for a railway vehicle, characterized by comprising a close relay for receiving a bus breaker closing instruction, an open relay for receiving a bus breaker opening instruction, a power supply circuit for a bus breaker, a power supply circuit for a hold relay, and a delay module (RS); wherein a main contact of the bus breaker is connected to a circuit of a high-voltage bus and used for controlling connection/disconnection of the high-voltage bus;

the power supply circuit for the hold relay comprises a normally-closed contact of the open relay, a first auxiliary normally-open contact of the bus breaker, and the hold relay which are sequentially connected in series to a train power supply; and the power supply circuit for the bus breaker comprises a first normally-open contact of the hold relay and the bus breaker which are sequentially connected in series to the train power supply; and the delay module is connected in parallel with the hold relay, normally-closed contacts of the delay module are connected in series to the power supply circuit for the close relay, and a high-potential terminal of the close relay is connected to a high-potential terminal of the delay module through a first normally-open contact of the close relay.

Furthermore, the present invention also provides a railway vehicle, characterized by comprising a bus breaker control circuit for a railway vehicle as described above.

The invention has the following beneficial effects: the bus breaker control circuit provided by the present invention has a simple and reliable internal current logic, and is low in power consumption; and the use of high-voltage devices is reduced, so that the use frequency is reduced, the service life of the bus breaker is prolonged, and the cost is reduced. By using the bus breaker control circuit provided by the present invention, an instruction may be sent based on whole vehicle logic judgment or the bus breaker may be forced to close manually, and a control device in the bus breaker box executes the instruction. It is ensured that the bus breaker can be opened/closed under a specific condition or opened/closed manually, and the solution is simple and saves the hardware cost.

BRIEF DESCRIPTION OF THE DRAWINGS

FIGURE shows a schematic diagram of a bus breaker control circuit for a railway vehicle of the present invention.

Reference numerals in the drawings are illustrated as follows:

BHBCB: control breaker, BHBHCB: hold breaker, BHBC: bus breaker closing instruction switch, BHBO: bus breaker opening instruction switch, BHB_HOLD: hold relay, BHB_HOLD-1: first normally-open contact of hold relay, BHB_HOLD-2: second normally-open contact of hold relay, BHB: bus breaker, BHB-1: main contact of bus breaker, BHB-2: first auxiliary contact of bus breaker, BHB-3: second auxiliary contact of bus breaker, RS: delay module, RS-1: first normally-closed contact of delay module, RS-2: second normally-closed contact of delay module, R: current limiting resistor, BHB_OPEN: open relay, BHB_OPEN-1: normally-closed contact of open relay, BHB_CLOSE: close relay, BHB_CLOSE-1: first normally-open contact of close relay, BHB_CLOSE-2: second normally-open contact of close relay, BHB_CLOSE-3: third normally-open contact of close relay, BHB_BOX: bus breaker box, D1: diode, K1: bus breaker power supply port, K2: hold relay power port, K3: bus breaker closing instruction port, K4: bus breaker opening instruction port, K5: DC 1500 V positive input port, K6: DC 1500 V negative output port, K7: bus breaker state feedback port, K8: DC 110 negative port, K9: hold relay state feedback port, K10: DC 110 negative port.

DETAILED DESCRIPTION OF THE EMBODIMENTS

Embodiments of the present invention will now be described with reference to the accompanying drawings.

As shown in the FIGURE, a bus breaker control circuit for a railway vehicle provided by the present invention is installed in a bus breaker box BHB_BOX. The bus breaker box BHB_BOX is provided with a plurality of external interfaces, including: a bus breaker power supply port K1, a hold relay power supply port K2, a bus breaker closing instruction port K3, a bus breaker opening instruction port K4, a DC 1500 V positive input port K5, a DC 1500 V negative output port K6, a bus breaker state feedback port K7, a DC 110 negative port K8, a hold relay state feedback port K9, and a DC 110 negative port K10.

The bus breaker control circuit comprises a close relay BHB_CLOSE for receiving a bus breaker closing instruction, an open relay BHB_OPEN for receiving a bus breaker opening instruction, a power supply circuit for a bus breaker BHB, a power supply circuit for a hold relay BHB_HOLD, and a delay module RS. A main contact BHB-1 of the bus breaker BHB is connected to a circuit of a high-voltage bus and used for controlling connection/disconnection of the high-voltage bus. A fuse MF is connected in series to a high-potential terminal of the main contact BHB-1 of the bus breaker BHB to provide overcurrent fusing protection for the bus.

The power supply circuit for the hold relay BHB_HOLD comprises a normally-closed contact BHB_OPEN-1 of the open relay BHB_OPEN, a first auxiliary normally-open contact BHB-2 of the bus breaker BHB, and the hold relay BHB_HOLD which are sequentially connected in series to a train power supply; and a high-potential terminal of the hold relay BHB_HOLD outputs through a second normally-open contact BHB_HOLD-2 of the hold relay BHB_HOLD, and is used for feeding back a state of the hold relay BHB_HOLD. The high-potential terminal of the power supply circuit for the hold relay BHB_HOLD (hold relay power supply port K2) is connected to the positive pole of the train power supply through a holding breaker BHBHCB.

The power supply circuit for the bus breaker BHB comprises a first normally-open contact BHB_HOLD-1 of the hold relay BHB_HOLD and the bus breaker BHB which are sequentially connected in series to the train power supply. The current for starting the bus breaker BHB is large, while a small current can keep the working state of the bus breaker BHB after the start-up. Therefore, the power supply circuit for the bus breaker BHB is optimized, namely: two branch circuits connected in parallel are provided between the first normally-open contact BHB_HOLD-1 of the hold relay BHB_HOLD and the bus breaker BHB, a current limiting resistor R is connected in series in the first branch circuit, and a second normally-open contact BHB_CLOSE-2 and a third normally-open contact BHB_CLOSE-3 of the close relay BHB_CLOSE are connected in series in the second branch circuit. The optimization of the circuit will be specifically described in detail below. A high-potential terminal of the power supply circuit for the bus breaker relay BHB (bus breaker power supply port K1) is connected to the positive pole of the train power supply through a control breaker BHBCB. the bus breaker BHB is provided with a second auxiliary normally-open contact BHB-3, a first terminal of the second auxiliary normally-open contact BHB-3 is connected to a positive pole of the train power supply, while a second terminal is connected to the bus breaker state feedback port K7 and is used for feeding back the state of the bus breaker BHB (i.e. bus breaker state feedback). As shown in the FIGURE, the first terminal of the second auxiliary normally-open contact BHB-3 is connected to the hold relay power supply port K2, and of course, may be connected to the bus breaker power supply port K1, or may be independently provided with a power supply port (for safety reasons, it needs to separately provide a circuit breaker to be connected to the positive pole of the train power supply).

The delay module RS is connected in parallel with the hold relay BHB_HOLD, a first normally-closed contact RS-1 and a second normally-closed contact RS-2 of the delay module RS are connected in series to the power supply circuit for the close relay BHB_CLOSE, a diode D1 is connected in series on a high-potential side of the power supply circuit for the close relay BHB_CLOSE, and a high-potential terminal of the close relay BHB_CLOSE is connected to a high-potential terminal of the delay module RS through a first normally-open contact BHB_CLOSE-1 of the close relay BHB_CLOSE.

In this embodiment, the bus breaker closing instruction and the bus breaker opening instruction are given, respectively, by a bus breaker closing instruction switch BHBC and a bus breaker opening instruction switch BHBO which are controlled by an LCU, the high-potential terminal of the close relay BHB_CLOSE is connected to the positive pole of the train power supply through the bus breaker closing instruction switch BHBC, and the high-potential terminal of the open relay BM OPEN is connected to the positive pole of the train power supply through the bus breaker opening instruction switch BHBO.

The bus breaker control circuit operates in the following process:

when a bus breaker closing instruction is triggered in the LCU, the bus breaker closing instruction switch BHBC is closed, the close relay BHB_CLOSE is electrified, and the first normally-open contact BHB_CLOSE-1 of the close relay BHB_CLOSE is closed, so that the delay module RS and the hold relay BHB_HOLD are electrified. The hold relay BHB_HOLD is electrified, and the state of the hold relay is fed back to the LCU (via port K9) through the second normally-open contact BHB_HOLD-1 of the hold relay BHB_HOLD. Meanwhile, the first normally-open contact BHB_HOLD-1 of the hold relay BM HOLD located in the power supply circuit for the bus breaker BHB is also closed (at this time, the second normally-open contact BHB_CLOSE-2 and the third normally-open contact BHB_CLOSE-3 of the close relay BHB_CLOSE are already in the closed state), so that the current limiting resistor R is shorted, and the train power supply supplies power to the bus breaker BHB via the control breaker BHBCB, the first normally-open contact BHB_HOLD-1 of the hold relay BHB_HOLD, and the second normally-open contact BHB_CLOSE-2 and the third normally-open contact BHB_CLOSE-3 of the close relay BHB_CLOSE. At this time, there is no other loads in the power supply circuit, the bus breaker BHB obtains a large starting current to achieve a quick operation, and the main contact BHB-1 of the bus breaker is closed, so that the high-voltage bus is connected, and the traction bus goes throughout the whole vehicle. At the same time, the first auxiliary contact BHB-2 of the bus breaker is closed, so that the power supply circuit for the hold relay BHB_HOLD is electrified, the train power supply continuously supplies power to the hold relay BHB_HOLD via the holding breaker BHBHCB, the port K2, the normally-closed contact BHB_OPEN-1 of the open relay, and the first auxiliary contact BHB-2 of the bus breaker, and the port K9 also keeps electrified. After the bus breaker BHB is electrified, the second auxiliary contact BHB-3 of the bus breaker is also closed, and the state of the bus breaker BHB is fed back to the LCU through the port K7. After the delay module RS delays for 1 s (which can be set in the system), the first normally-closed contact RS-1 of the delay module and the second normally-closed contact RS-2 of the delay module are opened, so that the close relay BHB_CLOSE is not electrified, the second branch circuit in the power supply circuit for the bus breaker BHB is broken, and the bus breaker BHB is supplied with power through the first branch circuit, that is, the train power supplies power to the bus breaker BHB through the current limiting resistor R. As the bus breaker BHB has been started, the working condition can be maintained by just a small current, so that the power supply of the second branch circuit is disconnected, the energy consumption is reduced with the current limiting resistor, and a function of protecting the bus breaker BHB is also provided. At the same time, the first normally-open contact BHB_CLOSE-1 of the close relay is opened. The function of the first normally-open contact BHB_CLOSE-1 of the close relay is to switch on the working current for the hold relay BHB_HOLD and the delay module RS at an early stage after the LCU gives a close signal, and to cut off the power supply line to the hold relay BHB_HOLD through the K3 port when the power supply circuit for the hold relay is electrified. Cutting off the power supply line does not change the current state of the overall control circuit.

When a bus breaker opening instruction is triggered in the LCU, the bus breaker opening instruction switch BHBO is closed, the open relay BHB_OPEN is electrified, the normally-closed contact BHB_OPEN-1 of the open relay disconnects the power supply circuit for the hold relay, so that the hold relay BHB_HOLD and the delay module RS are not electrified; and the power supply circuit for the bus breaker is broken by the first normally-open contact of the hold relay, so that the bus breaker BHB is not electrified, and the main contact BHB-1 of the bus breaker disconnects the traction bus. At this time, both port K7 and port K9 are not electrified, which is fed back to the LCU. The delay module RS is not electrified, so that the first normally-closed contact RS-1 and the second normally-closed contact RS-2 of the delay module are closed, and the delay module RS returns to the initial state and waits for the triggering of a next bus breaker closing signal.

In the bus breaker control circuit for a railway vehicle of the embodiment, the state of the bus breaker and the state of the hold relay are fed back to the LCU through the bus breaker state feedback port K7 and the hold relay state feedback port K9, respectively, and displayed on a driver's display screen.

In addition to the embodiments described above, other embodiments of the invention are possible. All technical solutions formed by equivalent replacements or equivalent transformations fall within the protection scope of the present invention.

What is claimed is:

1. A bus breaker control circuit for a railway vehicle, comprising
a close relay (BHB_CLOSE) for receiving a bus breaker closing instruction,
an open relay (BHB_OPEN) for receiving a bus breaker opening instruction,
a power supply circuit for a bus breaker (BHB),
a power supply circuit for a hold relay (BHB_HOLD), and
a delay module (RS);
wherein a main contact (BHB-1) of the bus breaker (BHB) is connected to a circuit of a high-voltage bus and used for controlling a connection/disconnection of the high-voltage bus;
the power supply circuit for the hold relay (BHB_HOLD) comprises
a normally-closed contact (BHB_OPEN-1) of the open relay (BHB_OPEN),
a first auxiliary normally-open contact (BHB-2) of the bus breaker (BHB), and
the hold relay (BHB_HOLD);
wherein the normally-closed contact (BHB_OPEN-1) of the open relay (BHB_OPEN), the first auxiliary normally-open contact (BHB-2) of the bus breaker (BHB), and the hold relay (BHB_HOLD) are sequentially connected in series to a train power supply;
the power supply circuit for the bus breaker (BHB) comprises
a first normally-open contact (BHB_HOLD-1) of the hold relay (BHB_HOLD) and
the bus breaker (BHB);
wherein the first normally-open contact (BHB_HOLD-1) of the hold relay (BHB_HOLD) and the bus breaker (BHB) are sequentially connected in series to the train power supply; and
the delay module (RS) is connected in parallel with the hold relay (BHB_HOLD),
normally-closed contacts (RS-1, RS-2) of the delay module (RS) are connected in series to a power supply circuit for the close relay (BHB_CLOSE), and
a high-potential terminal of the close relay (BHB_CLOSE) is connected to a high-potential terminal of the delay module (RS) through a first normally-open contact (BHB_CLOSE-1) of the close relay (BHB_CLOSE).

2. The bus breaker control circuit according to claim 1, wherein two branch circuits connected in parallel are provided between the first normally-open contact (BHB_HOLD-1) of the hold relay (BHB_HOLD) and the bus breaker (BHB), a current limiting resistor (R) is connected in series in a first branch circuit of the two branch circuits, and second normally-open contacts (BHB_CLOSE-2, BHB_CLOSE-3) of the close relay (BHB_CLOSE) are connected in series in a second branch circuit of the two branch circuits.

3. The bus breaker control circuit according to claim 1, wherein a high-potential terminal of the hold relay (BHB_HOLD) outputs through a second normally-open contact (BHB_HOLD-2) of the hold relay (BHB_HOLD), and is used for feeding back a state of the hold relay (BHB_HOLD).

4. The bus breaker control circuit according to claim 1, wherein the bus breaker (BHB) is provided with a second auxiliary normally-open contact (BHB-3), and a first terminal of the second auxiliary normally-open contact (BHB-3) is connected to a positive pole of the train power supply, and is used for feeding back a state of the bus breaker (BHB).

5. The bus breaker control circuit according to claim 1, wherein a diode (D1) is connected in series on a high-potential side of the power supply circuit for the close relay (BHB_CLOSE).

6. The bus breaker control circuit according to claim 1, wherein a high-potential terminal of the power supply circuit for the bus breaker (BHB) is connected to a positive pole of the train power supply through a control breaker (BHBCB).

7. The bus breaker control circuit according to claim 1, wherein a high-potential terminal of the power supply circuit for the hold relay (BHB_HOLD) is connected to a positive pole of the train power supply through a holding breaker (BHBHCB).

8. The bus breaker control circuit according to claim 1, wherein the bus breaker closing instruction and the bus breaker opening instruction are given, respectively, by a bus breaker closing instruction switch (BHBC) and a bus breaker opening instruction switch (BHBO), wherein bus breaker closing instruction switch (BHBC) and a bus breaker opening instruction switch (BHBO) are controlled by an LCU, the high-potential terminal of the close relay (BHB_CLOSE) is connected to a positive pole of the train power supply through the bus breaker closing instruction switch (BHBC), and a high-potential terminal of the open relay (BHB_OPEN) is connected to the positive pole of the train power supply through the bus breaker opening instruction switch (BHBO).

9. The bus breaker control circuit according to claim 1, wherein a fuse (MF) is connected in series to a high-potential terminal of the main contact (BHB-1) of the bus breaker (BHB).

10. A railway vehicle, comprising the bus breaker control circuit for the railway vehicle according to claim 1.

11. The railway vehicle according to claim 10, wherein two branch circuits connected in parallel are provided between the first normally-open contact (BHB_HOLD-1) of the hold relay (BHB_HOLD) and the bus breaker (BHB), a current limiting resistor (R) is connected in series in a first branch circuit of the two branch circuits, and second normally-open contacts (BHB_CLOSE-2, BHB_CLOSE-3) of the close relay (BHB_CLOSE) are connected in series in a second branch circuit of the two branch circuits.

12. The railway vehicle according to claim 10, wherein a high-potential terminal of the hold relay (BHB_HOLD) outputs through a second normally-open contact (BHB_HOLD-2) of the hold relay (BHB_HOLD), and is used for feeding back a state of the hold relay (BHB_HOLD).

13. The railway vehicle according to claim 10, wherein the bus breaker (BHB) is provided with a second auxiliary normally-open contact (BHB-3), and a first terminal of the second auxiliary normally-open contact (BHB-3) is connected to a positive pole of the train power supply, and is used for feeding back a state of the bus breaker (BHB).

14. The railway vehicle according to claim 10, wherein a diode (D1) is connected in series on a high-potential side of the power supply circuit for the close relay (BHB_CLOSE).

15. The railway vehicle according to claim 10, wherein a high-potential terminal of the power supply circuit for the bus breaker (BHB) is connected to a positive pole of the train power supply through a control breaker (BHBCB).

16. The railway vehicle according to claim 10, wherein a high-potential terminal of the power supply circuit for the hold relay (BHB_HOLD) is connected to a positive pole of the train power supply through a holding breaker (BHBHCB).

17. The railway vehicle according to claim 10, wherein the bus breaker closing instruction and the bus breaker opening instruction are given, respectively, by a bus breaker closing instruction switch (BHBC) and a bus breaker opening instruction switch (BHBO), wherein bus breaker closing instruction switch (BHBC) and a bus breaker opening instruction switch (BHBO) are controlled by an LCU, the high-potential terminal of the close relay (BHB_CLOSE) is connected to a positive pole of the train power supply through the bus breaker closing instruction switch (BHBC), and a high-potential terminal of the open relay (BHB_OPEN) is connected to the positive pole of the train power supply through the bus breaker opening instruction switch (BHBO).

* * * * *